United States Patent
Marsh, III et al.

(10) Patent No.: US 6,584,511 B1
(45) Date of Patent: Jun. 24, 2003

(54) LOOP INITIALIZATION PROCEDURE EXCEPTION HANDLING FOR FIBRE CHANNEL TRANSMISSIONS

(75) Inventors: Ralph Ernest Marsh, III, Trabuco Canyon, CA (US); Kathryn Ann McDonald, Yorba Linda, CA (US); Willis Lloyd Jacobs, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/534,519

(22) Filed: Mar. 24, 2000

(51) Int. Cl.[7] ............................................. G06F 13/00
(52) U.S. Cl. .......................... 710/5; 710/48; 710/15; 710/260; 710/264; 710/266
(58) Field of Search ...................... 710/36, 48, 49, 710/50, 5–7, 260–269, 15

(56) References Cited

U.S. PATENT DOCUMENTS

| | | | |
|---|---|---|---|
| 4,833,598 A | * | 5/1989 | Imamura et al. ............ 710/260 |
| 5,606,703 A | * | 2/1997 | Brady et al. ................ 710/264 |
| 5,727,218 A | * | 3/1998 | Hotchkin .................... 710/260 |
| 5,797,038 A | * | 8/1998 | Crawford et al. ............ 710/48 |
| 5,848,293 A | * | 12/1998 | Gentry ......................... 710/5 |
| 6,170,025 B1 | * | 1/2001 | Drottar et al. ............... 710/48 |
| 6,397,284 B1 | * | 5/2002 | Sleeman et al. ............ 710/266 |

* cited by examiner

Primary Examiner—Jeffrey Gaffin
Assistant Examiner—Mike Nguyen
(74) Attorney, Agent, or Firm—Alfred W. Kozak; Mark T. Starr; Lise A. Rode

(57) ABSTRACT

A fiber optic channel loop provides a transmission path between a computer platform and a multiple number of peripheral devices. When any change occurs in the number of connected peripheral devices or their operation status, then Fiber Channel loop is interrupted so to disable ongoing Input/Output operations to a targeted peripheral device. When this interruption is sensed, the Master Control Program of the platform will institute corrective measures to re-originate any interrupted I/O operations.

21 Claims, 4 Drawing Sheets

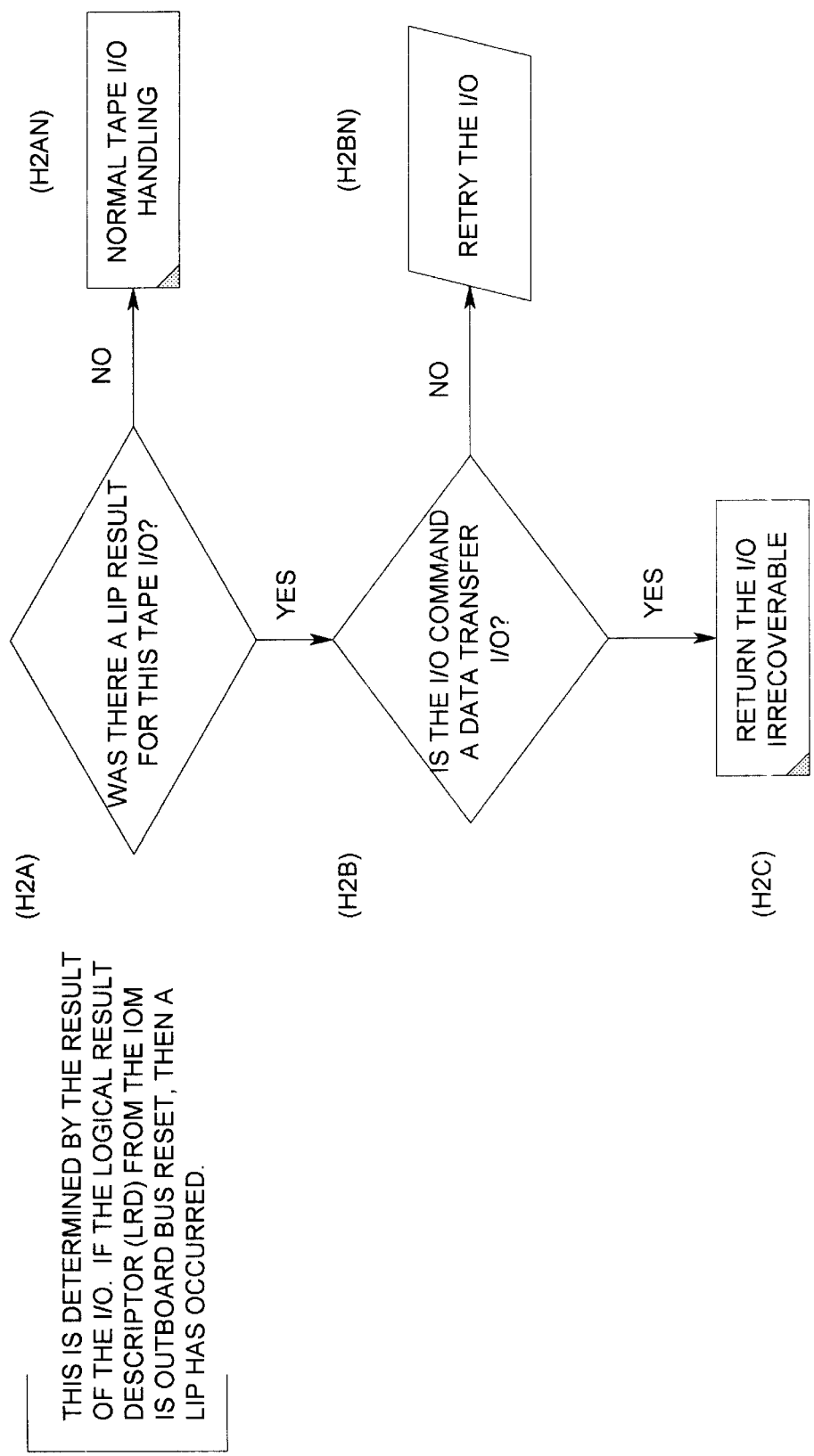

LOOP INITIALIZATION PROCEDURE EXCEPTION HANDLING FOR FIBRE CHANNEL TRANSMISSIONS

FIELD OF THE INVENTION

This disclosure relates to systems using Fibre Channel devices wherein while new devices can be added or removed to the system but this incurs a disruption and an exception condition which is caused, which then requires specialized handling.

BACKGROUND OF THE INVENTION

Many systems are connected to remote peripheral devices such as tape controllers and disk units via Fibre Channel optical cable for the purpose of writing and storing data and also for the purpose of reading back data.

Fibre Channel involves a type of transmission path often used as an internal computer channel as well as a network medium for transmission. It works with existing interfaces such as IPI, SCSI, and certain other interfaces. In a local area network, it can be used as a high-speed data transmission medium. It provides for speeds ranging up to a hundred megabytes per second with use of optical fibre.

Packets of information can be transferred from a computer platform through a Fibre Channel host bus adaptor while carrying an address which will transport a packet of data to a given tape controller or to a particular disk unit.

Under normal operations, there is a standard transmittal of data from the computer platform over to the designated tape controller or disk unit as long as the network stays stable with the same number of peripheral units and no changes have been made.

However, should a tape controller be added to the network fibre optic cable channels or should a new disk unit be added and connected through fibre optic cable to the platform, this completely changes the operating situation and leads to transmission completion problems, since the interruption to the status quo has now changed the conditions of operation so that the transmission loops for carrying the data may no longer be operable.

Thus, in those situations where a peripheral such as a tape controller was added in, this injected an element of confusion and interruption to the transmission loop, which often resulted in the lack of proper completion of data transmission.

GLOSSARY OF TERMS

MASTER CONTROL PROGRAM (MCP): This denotes the operating system software that is used to operate on a ClearPath platform which is a Unisys Corporation computer system.

INPUT/OUTPUT CONTROL BLOCK (IOCB): The Input/Output Control Block is a data structure used by the Master Control Program (MCP) to describe all the information needed to issue a Input/Output command to another device. This will include the (i) destination unit; (ii) the pointer to the data being transferred; (iii) the length of the Input/Output data; (iv) the Result Description which describes the outcome of the Input/Output operation to indicate whether it was in error or properly completed.

INPUT/OUTPUT MODULE (IOM): This is a particular module of a ClearPath system that is responsible for initiating and completing Input/Output operations from the Master Control Program (MCP) to a peripheral and/or vice versa.

FIBRE CHANNEL HOST BUS ADAPTER: This is a particular unit of a ClearPath computer system that is responsible for communicating on the Fibre Channel Loop.

MEMORY: This is the particular memory module of the ClearPath System that allows access to the E-Mode Memory of the Unisys Platform. This is the memory that is used by the operating system and all of its sub-modules.

PACKET ADDRESS UNIT: This is also called a Command Packet. This is a data structure used by the Input/Output module (IOM) and the CMU in order to transfer data for an I/O request from the host. This packet sustains much of the same characteristics that is done by the IOCB, except that this packet structure is used between the IOM, the CMU, and the Channels. In particular, this structure has an actual physical device which is to be communicated with.

HUB: This is the industry standard definition of a multi-connection black box. This device takes a Fibre Channel signal and propagates it to the next port in the box. Some Hubs have eight ports and some have sixteen and are manufactured by several different companies. Sometimes more than one Hub is used in a network because these devices allow greater connectivity.

TAPE CONTROLLER: This is the mechanism which controls and records and writes on the magnetic tape units which are used to write and store data which can be read out for later utilization.

FIBRE CHANNEL OPTICAL CABLE: This is the industry standard optical cable that carries the input and output lines of the Fibre Channel signal. It is used to connect one Fibre Channel device to another.

TAPE UNITS: In this context, these are Fibre Channel tape devices. In the present embodiment, this utilizes the CTS9840-FC Tape Drive from STK (Storage Tech Corporation).

DISK UNITS: These indicate Fibre Channel disk devices used for the recording, writing and reading of data.

FC ARBITRATED LOOP: This is a Fibre Channel Arbitrated Loop which is the encompassing configuration depicted with an initiator (the FC Channel HBA) and several targets, such as the tape and disk devices. HBA refers to the Host Bus Adapter.

INPUT/OUTPUT RESULT DESCRIPTOR (IORD): This is the information return from an Input/Output operation that describes any exceptions that occurred in the life of that particular Input/Output operation.

STILLBORN: This is a term given to an Input/Output operation that was intended to be initiated to a device, but thereupon an exception occurred before the Input/Output could get out to the device, thus causing the Input/Output operation to be returned back to the host without ever being received by the intended device.

TAPE EXCEPTION: This is the result signal of an Input/Output operation that is issued to a Tape Device, wherein that Tape Device has encountered a problem and returns an error signal for that particular Input/Output operation. In the present case, the tape exception would be designated as an OUTBOARD BUS RESET—this is otherwise known as a LIP or Loop Initialization Procedure.

LOCATE COMMAND: This is a SCSI tape command that moves the current logical position on the tape peripheral to a new position on the tape as specified by the information passed in this particular command.

READ POSITION COMMAND: A SCSI tape command that reports the current logical position of the drive, but does not cause any tape motion to occur.

TIMEOUT PROCEDURE: This is the procedure that determines how to handle an Input/Output operation (I/O) that has developed an "exception" which is designated as HANDLEMAGTAPEEXCEPTION.

TERMINATE I/O: This is a procedure designated TERMINATEIOOPERATION whereupon this procedure gets the initial I/O result back from the Input/Output module (IOM). It then processes the Result Descriptor to determine if this Input/Output can be quickly retried or whether it must be handled by the HANDLEMAGTAPEEXCEPTION.

OUTBOARD BUS RESET: The Fibre Channel Host Bus Adapter returns a signal called the Outboard Bus Reset when an input operation was incapable of being completed to its intended recipient.

UNIT NUMBER: This is a number given to a peripheral device so that it can be identified by the system.

FIBRE ADDRESS: This is the address needed for the Fibre Channel Host Bus Adapter (HBA) to deliver the Fibre Channel package to the designated peripheral device.

LIP RESULT (LOOP INITIALIZATION PROCEDURE RESULT): This is a Result Descriptor which is returned by the Input/Output unit to the Master Control Program (MCP) that signifies that a Loop Initialization Procedure has occurred (transmission interrupted) during that particular Input/Output operation. This result is also described as "Outboard Bus Reset" whenever it is displayed.

LIP INITIATION (LOOP INITIALIZATION PROCEDURE INITIATION): Whenever a fibre device on the loop is added into the loop or if something catastrophic occurs to the device and it needs to get cleared, then a Loop Initialization Procedure (LIP) is initiated.

DATA TRANSFER I/O: This is a SCSI/fibre command which causes data to be transferred along the interface. These commands would include such things as a Write or a Read command.

LOOP INITIALIZATION PROCEDURE (LIP): A Loop Initialization Procedure is initiated when a device is added onto the fibre loop or if one of the peripheral devices is "hung" and needs to be reset back to its original state. This resetting is done by causing a Loop Initialization Procedure which in turn, causes all devices in the loop to re-identify themselves on the loop.

CHANNEL MANAGER UNIT (CMU): This is an in-between intermediary section of the I/O subsystem. Every channel manager unit has 4 channels, so that the flow of an I/O really goes from the IOM to the CMU and then to the channel.

TERMINATEIOOPERATION: This is a procedure which takes place after the occurrence of a Loop Initialization Procedure and works to handle the Input/Output operation.

THE DISPLAY COMMAND: This is a command used to display an ASCII character string in the display panel of the tape device.

REWIND COMMAND: This is a command that causes the tape to be rewound to the logical beginning of the tape.

TEST COMMAND: This command provides a means for determining if the tape is ready to accept an appropriate medium access command.

SUMMARY OF THE INVENTION

In a system where a computer platform controls and organizes data for transmission to selected peripheral units such as tape controllers and disk units, provision is made for use of a Fibre Channel host bus adapter which can transfer the packets via Fibre Channel optical cable to a Hub which can then route the data packets over separate optical cable to different destinations, such as a specifically addressed tape controller or a specifically addressed disk unit.

However, when a new peripheral is added to the Fibre Channel optical loop or if a peripheral is removed, this causes an unsettled situation where the Fibre Channel loop, designated as a Fibre Channel arbitrated loop, no longer recognizes the earlier group of peripherals and must be reconstituted and set up to recognize the new state of peripheral devices which are connected to the fibre optic loop.

In this situation, a Loop Initialization Procedure (LIP) is instituted which then attempts to reconstitute the loop after the disruption. Thus, any Input/Output operations previously issued to a tape or disk device will now have to be recovered.

At the moment of the disruption, if the I/O operation has not yet been issued to the peripheral device, then the Input/Output processor signifies this by initiating a Result Descriptor which informs the computer platform. And in this case, the Master Control Program (MCP) of the computer platform will retry this particular Input/Output operation.

However, if the I/O operation has already been issued to the device, and during the transmission is informed that a Loop Initialization Procedure has occurred which indicates that there has been a reconstitution of the peripherals from what was previously in operation, then the Master Control Program (MCP) of the platform will determine what particular kind of Input/Output operation was issued and reissue the Input/Output operation if this is possible.

However, if the Input/Output operation was a command which was in transition but whereby it could not be determined what the position of the tape head was at the time of the Loop Initialization Procedure, then the input operation has to be considered as failed and determined to be non-recoverable, and this is indicated in a Result Descriptor which is fed to the computer platform.

BRIEF DESCRIPTION OF THE DRAWINGS

FIG. 2C is a flow chart showing the HANDLEMAGTAPEEXCEPTION condition.

DESCRIPTION OF PREFERRED EMBODIMENT

Figure 1:
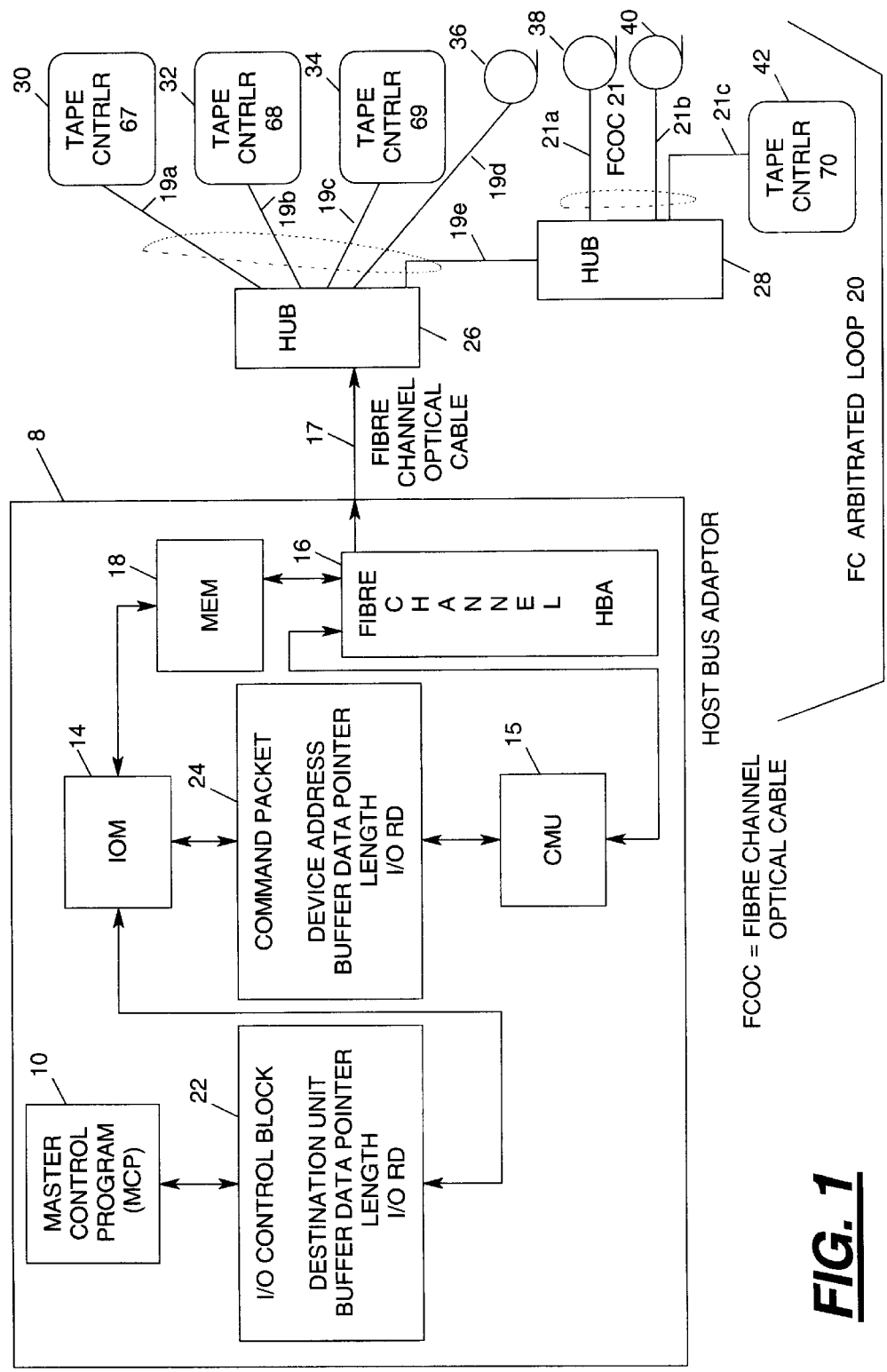
FIG. 1 is an overall system diagram showing a computer platform connected via fibre optical channel links to a series of peripheral devices such as tape controllers and disk units.

Referring to FIG. 1, there is seen a diagram of elements involved in data transfers from a platform 8 over to various peripheral devices, such as tape controllers and disk units which are interconnected by Fibre Channel optical cables. The connections from the Fibre Channel host bus adapter 16 over to the various peripheral devices 30, 32, 34, 38, 40, etc., is accomplished through the use of Fibre Channel optical cable indicated as 17, 19, 21 in FIG. 1. The transmission lines from the Fibre Channel host bus adapter 16 to the peripheral devices are done through use of a Fibre Channel arbitrated loop 20 shown in FIG. 1.

The computer platform 8 is seen to have a Master Control Program 10 which utilizes an Input/Output Control Block 22 which provides destination unit information and holds buffered data for transmission, plus information as to the length of the buffered data, and the final I/O result designated as the Input/Output Result Descriptor (IORD). The Input/Output Control Block (IOCB) 22 is passed to the Input/Output Module 14 which converts the IOCB into a Command Packet 24. The Command Packet 24 provides the device address (based on the destination unit in the IOCB 22), buffer data pointer, the length of the buffer data, and the I/O Result Descriptor. The IOM also has access to memory 18. A memory unit 18 holds data which is connected to and can be accessed by the I/O Module and the Fibre Channel Host Bus Adapter 16. The IOM passes the information in the Command Packet 24 to the Channel Manager Unit 15. This is part of the I/O subsystem that delivers the information from the IOM 14 to the Fibre Channel Host Bus Adapter 16. With access to memory 18, the Fibre Channel Host Bus Adapter 16 transfers the data originating from the MCP out on the Fibre Channel optical cable 17 to the device address calculated in the command packet 24. The Fibre Channel Host Bus Adapter 16 then utilizes Fibre Channel optical cable 17 to pass the information to a Hub unit 26. The Hub unit is a device which takes a Fibre Channel signal and propagates it to the next port in the loop. Some Hubs have 8 ports and some have 16. These Hubs, such as 26 and 28 allow for greater connectivity.

The Hub unit 26 is seen to provide a series of Fibre Channel optical cables, shown as 19a, 19b, 19c, 19d, and 19e. These Fibre Channels are respectively connected to tape controllers 30, 32, 34 and disk unit 36, while the channel 19e is connected to another Hub 28 which then provides three Fibre Channel optical cables 21a, 21b, and 21c, respectively, over to disk unit 38, disk unit 40 and tape controller 42.

Thus, it is now possible for the platform to access data bytes and deliver and transfer these data bytes to an intended designated target tape controller or target disk unit for storage.

Similarly, either one of the tape controllers or disk units can have already stored data accessed from it and transferred back to the platform unit 8 of FIG. 1.

In FIG. 1, the peripheral units will have a unit designation whereby tape controller 30 has a unit ID number 67, while tape controller 32 has a Unit Number 68, and tape controller 42 may have a Unit Number 70. These are used for identification and designation purposes.

The I/O Control Block 22 (IOCB) and the Command Packet 24 each hold duplicate data for the target device address, the buffer data to be transmitted, the length of the buffer in bytes and the I/O Result Descriptor which indicates the status of the I/O operation.

The IOCB 22 operates from the MCP 10 to the IOM 14. The Command Packet 24 operates from the IOM 14 and the Channel Manager Unit 15 over to the Fibre Channel HBA 16.

The IORD is a word used in Unisys Corporation platforms that has several fields in it and also has a field which represents the result of each I/O operation.

In this embodiment, the IORD has 2-bits that are returned to the MCP 10. One of these bits represents the status as (i) Stillborn—not given to control, and (ii) Stillborn—not given to the I/O bus. These IORD bits are referred to as "Self-Terminated" bits. If either of these bits are "set", this signifies that no data was transferred to the target device and thus, it is now safe to retry the I/O operation.

The "Self-Terminated Bit" is a set of two bits signifying that (i) the I/O never made it to the target, and (ii) the I/O never even made it to the channel 16.

If either bit is set when the IORD is returned from the IOM 14, the MCP 10 will then retry the I/O.

The sequence for handling an interruption to an established transmission loop is delineated in the steps indicated in FIGS. 2A, 2B, and 2C described hereinbelow.

Figure 2A:
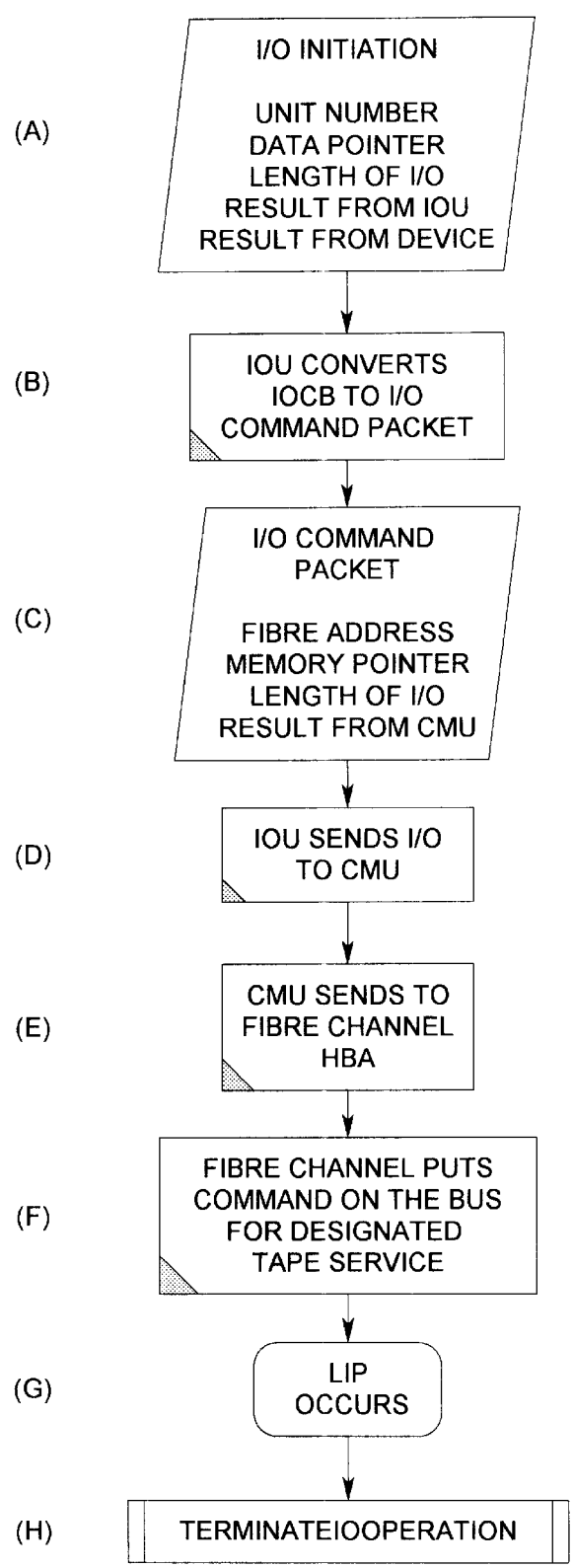
FIG. 2A is a flow chart showing the methodology involved in handling the Loop Initialization Procedure and illustrating the steps involved in reconstituting the changes in the network which now have to be used for a new set of communication channels.

Referring to FIG. 2A, at step A, the Master Control Program will initiate the Input/Output operation designated as I/O initiation. Here, there will be a designation for the intended recipient target unit which is designated as a Unit Number. Subsequently, a data pointer will be instituted which will point to the memory 18 in order to select a number of data bytes to be transferred to the selected Unit Number. Also in the information provided during I/O initiation is the length of the I/O which will be designated as a certain number of bytes, such as thirty-two bytes, for example.

The memory 18 will also provide storage space to indicate the result (called a Result Descriptor) from the Input/Output unit IOM 14 when the cycle is completed. Additionally, there will be a memory area designated in memory 18 which will be used to receive any acknowledgment or signals from the intended recipient device such as tape controller 30 or 32, etc.

At step B, the Input/Output Module 14 then converts the data in the Input/Output Control Block 22 (IOCB) to form a Command Packet 24.

At step C, the I/O Command Packet will provide the Fibre Channel address to isolate which particular Fibre Channel device will be utilized and additionally will utilize a memory pointer to access a buffer of data from memory 18. Further, the I/O Command Packet will indicate the length of the Input/Output operation in terms of data bytes and provide a memory location which will provide a receipt signal from the Channel Memory Unit 15 (CMU).

At step D, the Input/Output Module 14 will transmit the Input/Output data to the CMU 15.

At step E, the CMU 15 sends and transfers the data to the Fibre Channel Host Bus Adapter (HBA) 16.

At step F, the Fibre Channel Host Bus Adaptor (HBA) 16 puts the command on the bus 17 for a particularly designated Fibre Channel tape device such as tape controller 30, for example, which may have a Unit Number such as 67.

At step G, a Loop Initialization Procedure occurs. A signal goes out to cause all peripheral devices in the loop to re-negotiate their identities and Unit Numbers. This signal is seen by the Fibre Channel HBA 16 and returns the information that a LIP (Outboard Bus Reset Signal) was noted. This result is passed to the IOM 14 and the MCP 10.

At step H, there is initiated a terminate Input/Output operation designated as TERMINATEIOOPERATION.

Figure 2B:
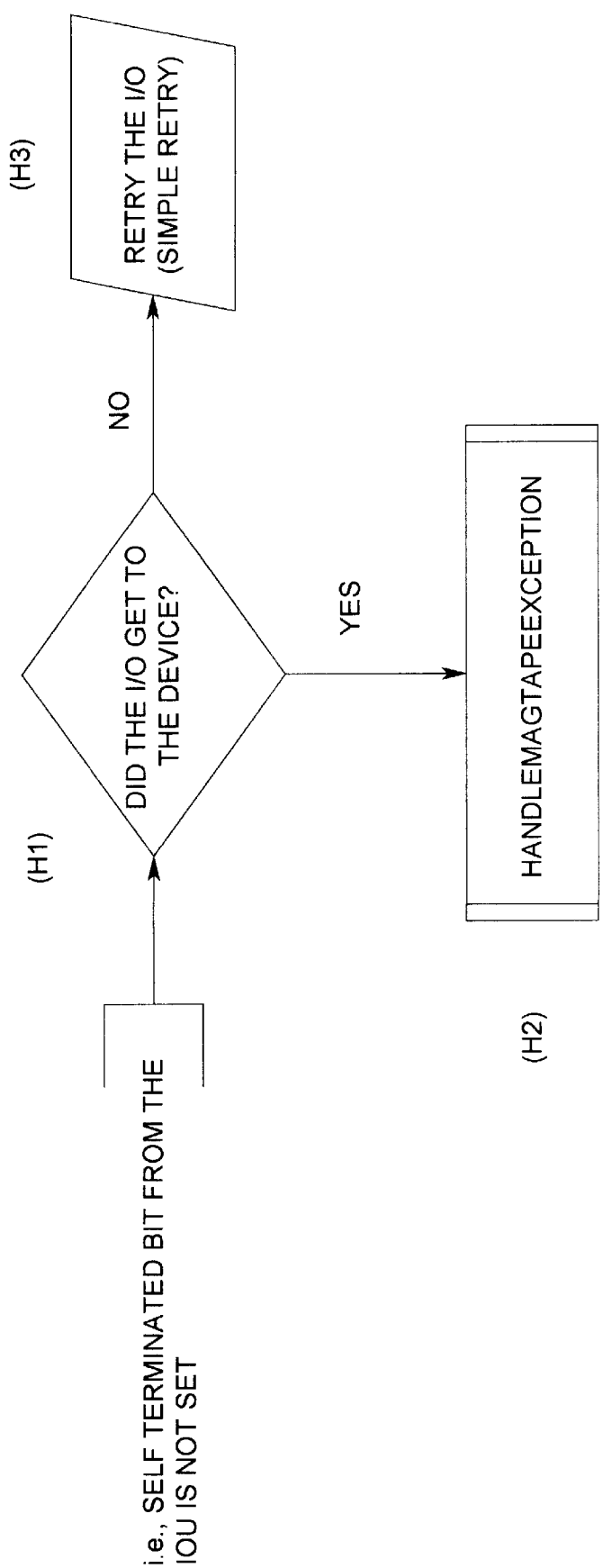
FIG. 2B is a flow chart showing the TERMINATEIOOPERATION.

Now referring to FIG. 2B, there is indicated the operational steps in the Terminate I/O Operation.

At step H1, a query is presented as to whether the I/O got to the intended device. If the answer here is "YES", then the next step is H2 which is the Handle Magnetic Tape Exception condition, designated as HANDLEMAGTAPEEXCEPTION which is further indicated in FIG. 2C.

At step H1, (FIG. 2B) if the answer is NO, that is to say the Input/Output transfer data did not get to the intended device, then step H3 is put into operation where there is a retry of the Input/Output operation which is initiated from the Master Control Program.

At step H1, (FIG. 2B) if the answer is NO, that is to say the Input/Output transfer data did not get to the intended device, then step H3 is put into operation where there is a retry of the Input/Output operation which is initiated from the Master Control Program. If step H1 is a YES, then the operation will proceed as seen in FIG. 2C.

Now referring to FIG. 2C, there is indicated the HANDLEMAGTAPEEXCEPTION program. This is determined by the result of the Input/Output operation. If the Logical Result Descriptor (LRD) from the Input/Output module 14 is an Outboard Bus Reset signal, this indicates that a Loop Initialization Procedure exception has occurred.

If the result of step H2A is a "YES," then at step H2B another query occurs to ask—is the I/O command a "data transfer I/O?" If H2B is a NO, then step H2BN indicates there is a retry of the Input/Output operation which is initiated from the Master Control Program.

Here, if the answer if YES, then at step H2C the system will return the Input/Output operation as "not-recoverable".

Described herein has been a method and system for detecting incomplete I/O operations from a computer platform to a target device over a transmission loop of Fibre Channel optical cable. After verification that the I/O command was a "Data Transfer" (rather than a Read or Write command), and when the I/O Result Descriptor is set to indicate a non-complete I/O, then the Master Control Program of the platform will initiate the appropriate corrective action.

While one preferred embodiment of the invention has been described, the system and method may encompass other embodiments as defined in the attached claims.

What is claimed is:

1. A method for handling exceptions to any I/O operation between a computer platform operating under a Master Control Program, and selected target peripheral unit, comprising the steps of:
   (a) identifying a target peripheral unit to be sent a data package of X selected bytes;
   (b) organizing by said Master Control Program, an I/O Command Packet with a selected Fibre Channel address and a buffer of data to be transmitted;
   (c) transmitting said buffer of data to a channel manager unit (CMU);
   (d) sending, by said CMU, of said data buffer to a selected Fibre Channel host bus adaptor (HBA) for conveyance to said Fibre Channel target peripheral device;
   (e) sensing by said Fibre Channel HBA, when an interruption to data transmission has occurred because of a Loop Initialization Procedure which operates to send a non-completed I/O signal to said Master Control Program.

2. The method of claim 1 which further includes the step of:
   (g) checking to see if I/O operations were indeed interrupted by a Loop Initialization Procedure (LIP);
   (h) continuing normal I/O operations if no valid LIP occurred.

3. The method of claim 1 where step (e) includes the steps of:
   (e1) sensing the occurrence of a LIP result indicating an exception event for the selected I/O operation;
   (e2) checking the selected I/O command to verify that I/O is transferred.

4. The method of claim 3 wherein step (e2) includes the step of:
   (e2a) retrying the selected I/O command operation if the I/O command did not transfer data.

5. The method of claim 3 wherein step (e2) includes the step of:
   (e2b) returning the I/O command as lost and irrecoverable if the I/O command was in the process of transferring data.

6. The method of claim 1 wherein step (e) includes the steps of:
   (ie) checking whether the I/O operation transmitted said buffer of data to said target peripheral unit;
   (iie) retrying the I/O if the buffer of data did not reach said target peripheral unit.

7. The method of claim 1 wherein step (e) includes the step of:
   (ae) instituting a special program designated HANDLEMAGTAPEEXCEPTION if the I/O operation did transfer any data of said buffer of data to said selected peripheral unit.

8. The method of claim 7 wherein step (ae) includes the steps of:
   (ae1) checking to see if a LIP result signal indicated that the selected I/O operation was not completed;
   (ae2) sensing whether the selected I/O command was recoverable;
   (ae3) returning the I/O command if the I/O was transferring data to indicate that the I/O is not recoverable.

9. The method of claim 8 wherein step (ae2) includes the step of:
   (ae2i) retrying the I/O if the I/O command did not transfer data.

10. A system for handling the notification of interrupted I/O operations between a computer platform and a selected target unit among multiple peripheral units connected to a Fibre Channel Loop comprising:
    (a) Master Control Program means to initiate an I/O data transfer command between a computer platform and a group of target peripheral units connected to a Fibre Optic Channel Loop;
    (b) fibre optic cable means forming an arbitrated transmission loop to said group of multiple peripheral units;
    (c) means to sense an exception condition signal in the I/O command during data transfer operations;
    (d) means for initiating a new Loop Initialization Procedure (LIP) to re-organize the identity numbers of said group of peripheral units when a change has occurred in the number of peripheral units connected to said Fibre Channel Loop for completing incomplete I/O data transfers when possible;
    (e) means for re-trying the transfer of data on those previous incomplete I/O data transfer commands.

11. A system of handling the notification of interrupted I/O operations between a computer platform means and a target peripheral unit utilizing a Fibre Channel optical cable comprising:
    (a) computer platform means for setting-up an I/O command for communication to multiple peripheral units;
    (b) Fibre Channel Host Bus Adaptor means for transferring a buffer of data from said platform to said target peripheral unit; including
        (b1) means for sensing any change in the Fibre Channel cable connections to said multiple peripheral units and for notifying said computer platform;
    (c) means for re-identifying the new channel cable connection arrangements of said multiple peripheral units via signals from said Fibre Channel Host Bus Adaptor;

(d) means for re-transmitting any incomplete I/O commands to completion or sensing those interrupted I/O commands which are not recoverable.

12. The system of claim 11 wherein said computer platform means includes:
   (a1) Master Control Program means for initiating and controlling I/O operations;
   (a2) I/O Control Block means for identifying a target peripheral unit and including:
      (a2a) a buffer unit for holding data of X bytes;
   (a3) a Command Packet means for holding (i) the target device address, (ii) buffer data retrieved from memory, (iii) Input/Output Result Descriptor information;
   (a4) an Input/Output Module which communicates with a Channel Manager Unit (CMU 15);
   (a5) said CMU for communicating to up to four different channels of which at least one of them is a Fibre Channel Host Bus Adapter;
   (a6) Fibre Channel Host Bus Adapter means (16) for conveying data to Hub means for Fibre Channel transmissions to a selected target device of multiple peripheral units.

13. The system of claim 10 wherein said LIP indicates those exception condition I/O operations which are recoverable.

14. In a computer platform wherein a Master Control Program organizes an I/O Control Block to utilize an I/O Module for designating a command packet to a Channel Manager Unit to convey data from memory to a Fibre Channel Host Bus Adaptor, a method for detecting a Loop Initialization Procedure for handling data transfers to and from selected peripheral units comprising the steps of:
   (a) sensing the identity of each peripheral device connected to a Fibre Optic loop from a hub connected to said Fiber Channel Host Bus Adaptor;
   (b) initiating a data transfer operation from said Memory to a selected peripheral unit by said Master Control Program.

15. The method of claim 14 which includes the steps of:
   (c) receiving, by said Fibre Channel Host Bus Adaptor, of an incomplete I/O operation signal indicating a different status of the peripheral units in said Fibre Channel Loop;
   (d) notifying said Master Control Program of said incomplete I/O operation;
   (e) re-trying the transfer of data to selected peripheral units after the earlier incomplete I/O operation.

16. The method of claim 15 wherein step (c) includes the step of:
   (c1) sending of a Result Descriptor message from said Fibre Channel Host Bus Adaptor to said Master Control Program.

17. A platform utilizing a Master Control Program which manages data transmissions to and from selected peripheral units comprising:

(a) Master Control Program means for enabling data transmission to and receiving data from selected peripheral units;
(b) I/O Control block means for selecting destination addresses of peripherals and pointers to data in memory to selected peripherals;
(c) an I/O Module means for utilizing said addresses and memory data into a command packet for conveyance to a Channel Manager Unit;
(d) a Fibre Channel Host Bus Adaptor means for conveying said memory data to a selected peripheral and for receiving signals as to non-completion of the data transfer;
(e) means using said Channel Manager and I/O Module to signal non-complete to said Master Control Program.

18. The platform of claim 17 which includes:
   (a) means to re-try data transmission for those incomplete data transmission attempts priorly attempted.

19. A method for handling exceptions to I/O operations between a computer platform operating under a Master Control Program (MCP) and selected target peripheral units comprising the steps of:
   (a) initiating a selected data transfer operation using an I/O Control Block by said MCP via an I/O Module, a Command Packet, a Channel Manager Unit (CMU) and Fibre Channel Host Bus Adaptor;
   (b) transmitting by said Fibre Channel Host Bus Adaptor, data transfer operation via a Fibre Channel Loop to selected target peripheral units;
   (c) sensing when a peripheral device has been removed from, or added to said Fibre Channel Loop and sending a Loop Initialization Procedure exception signal to said MCP;
   (d) determining by said MCP, that said data transfer operation Loop Initialization Procedure occurred in the middle of an I/O transfer operation;
   (e) terminating, by said MCP, of said I/O transfer operations.

20. The method of claim 19 wherein step (d) includes the steps of:
   (d1) determining, by said MCP, that said data transfer operation Loop Initialization Procedure indicated that no data was transferred;
   (d2) retrying of said incomplete data transfer operation by said MCP.

21. The method of claim 19 wherein step (d) further includes the steps of:
   (d3) determining, by said MCP, that a Loop Initialization Procedure exception signal occurred in the middle of a tape I/O operation;
   (d4) canceling, by said MCP, of said incomplete I/O data transfer operation.

* * * * *